Sept. 20, 1971  H. HABERLE, JR  3,606,059
ROLL-OFF TRAILER
Filed Dec. 15, 1969  4 Sheets-Sheet 1
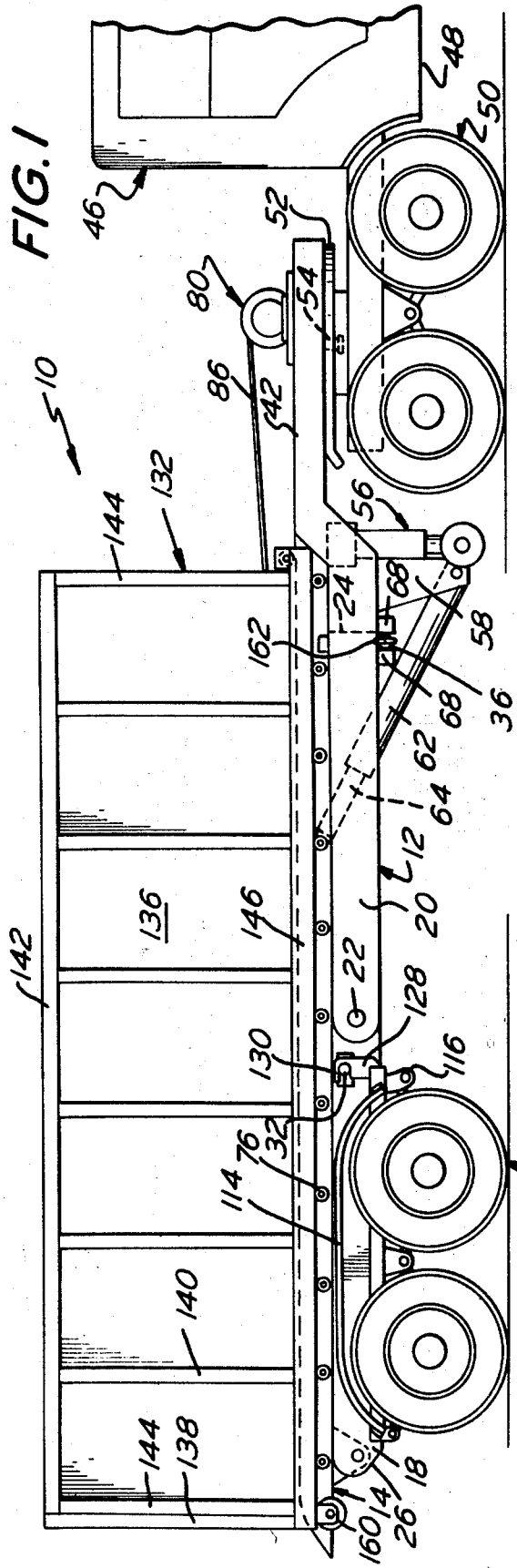
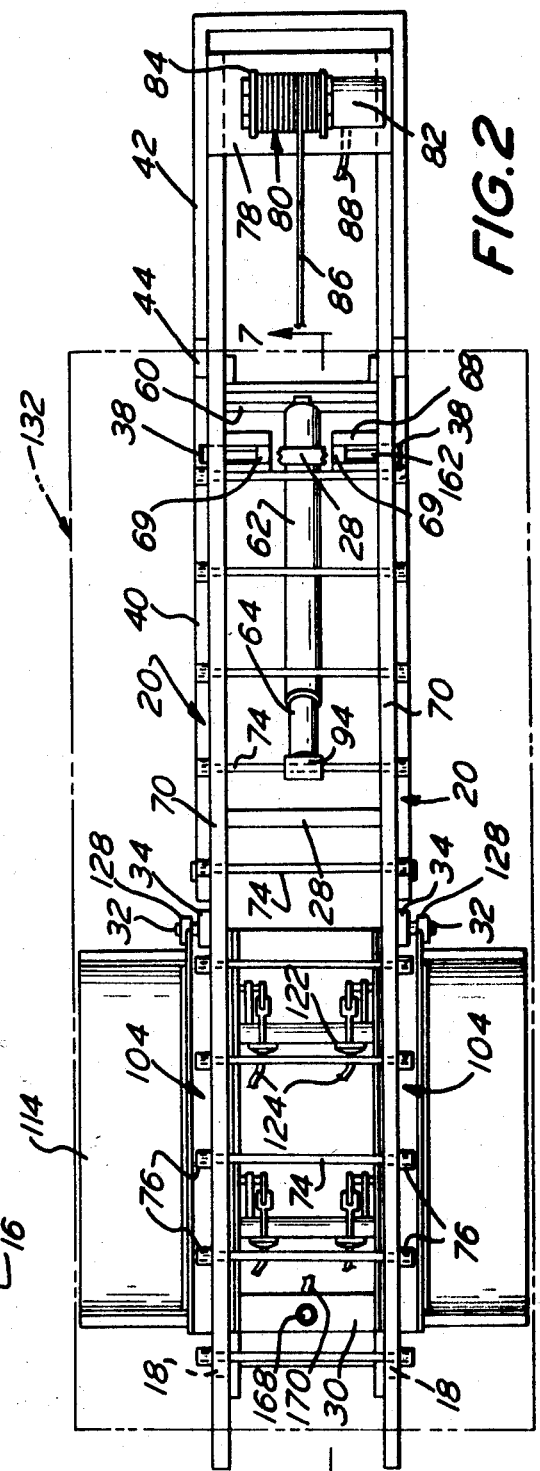
INVENTOR
HERBERT HABERLE, JR.
BY
*Caesar, Rivise,*
*Bernstein & Cohen*
ATTORNEYS.

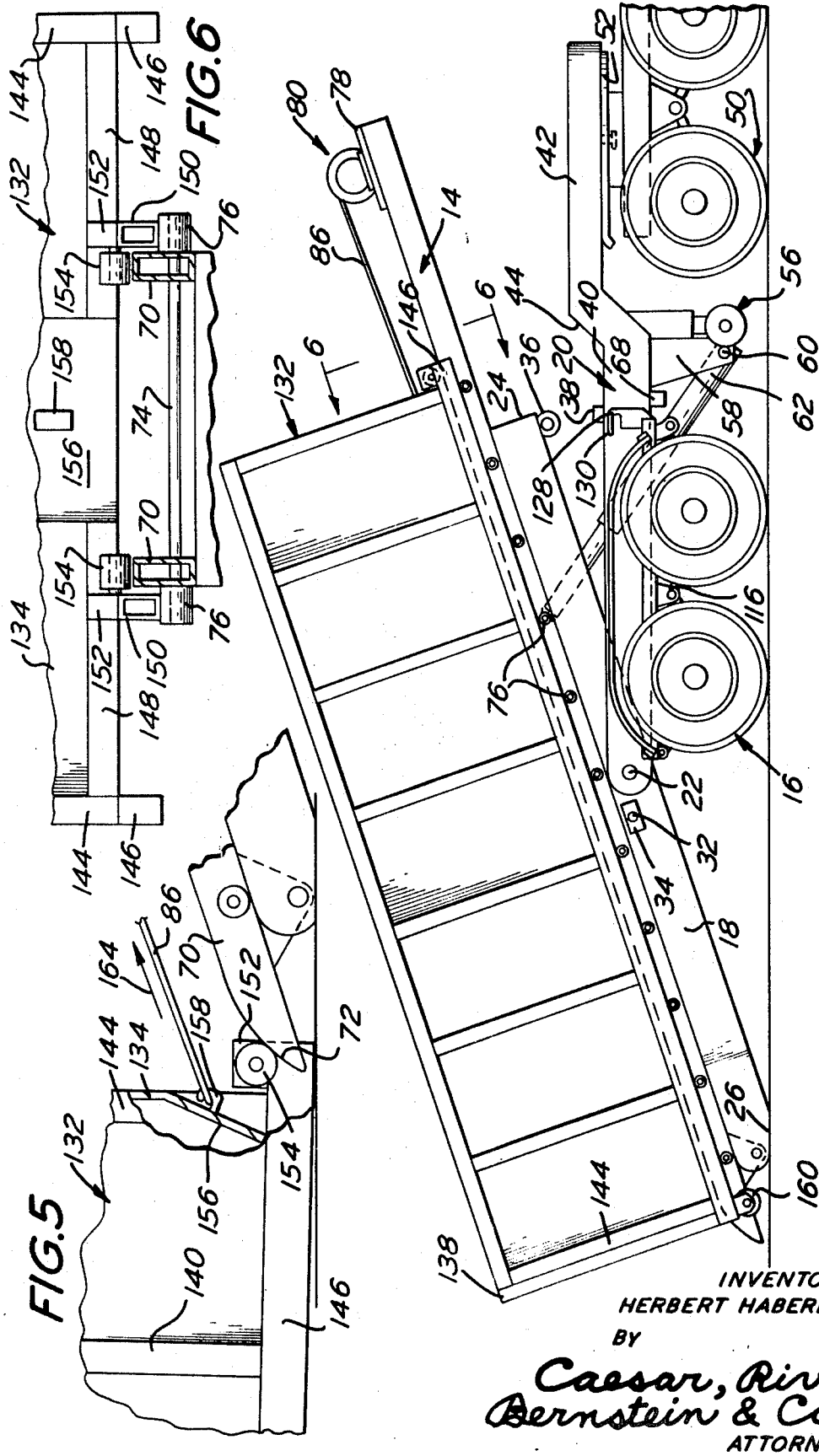

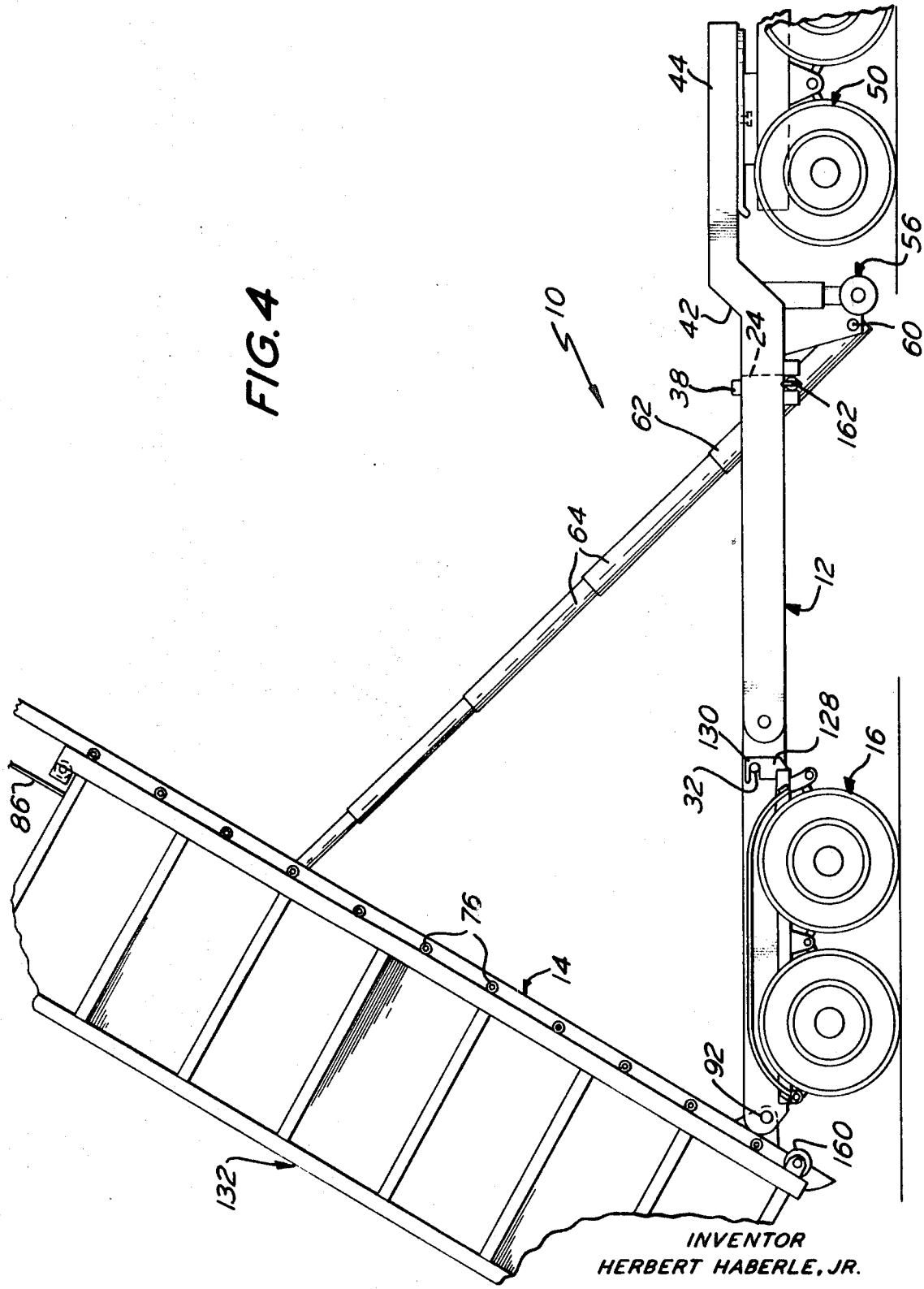

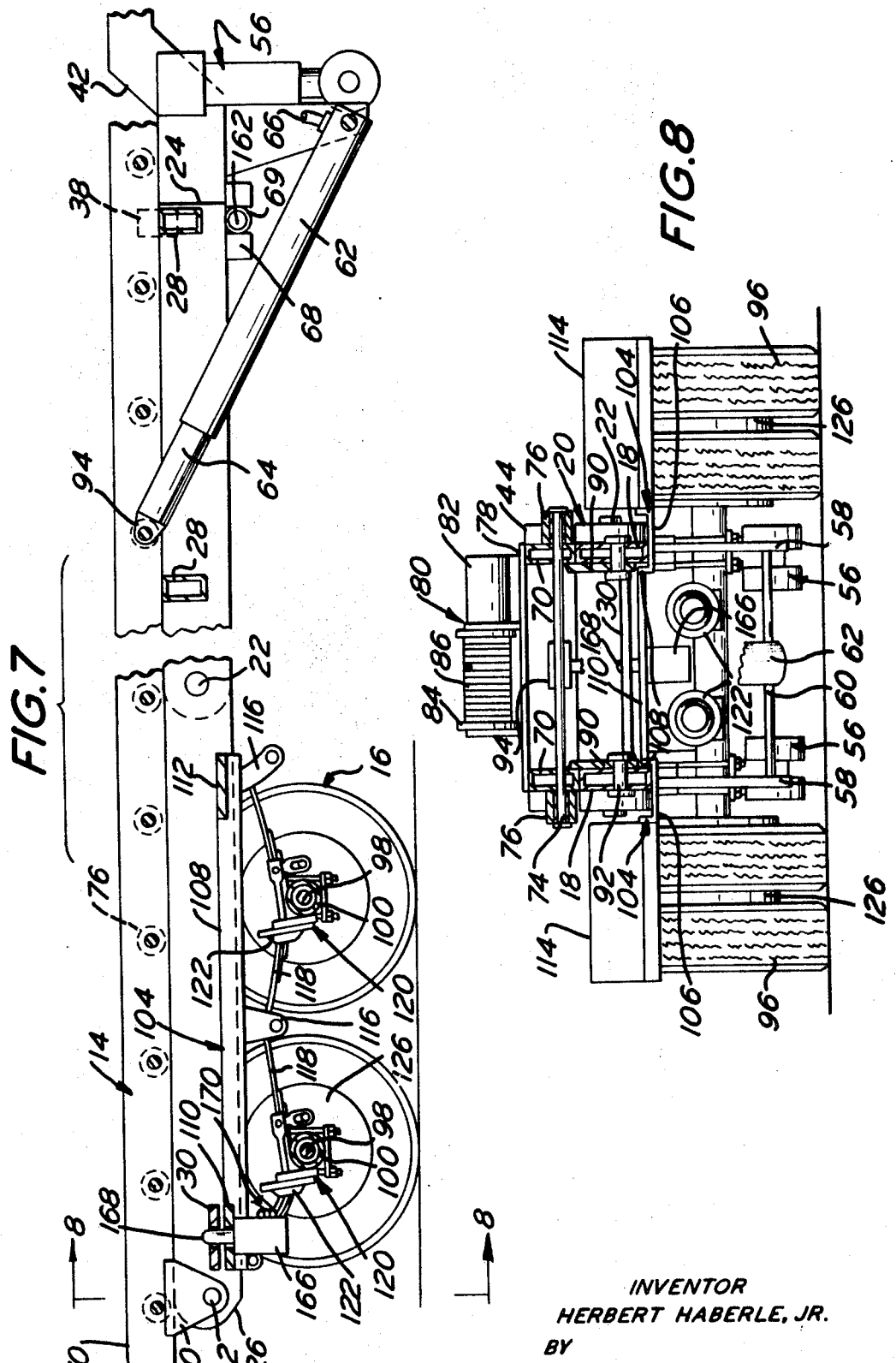

United States Patent Office 3,606,059
Patented Sept. 20, 1971

3,606,059
ROLL-OFF TRAILER
Herbert Haberle, Jr., 113 E. 4th St.,
Bridgeport, Pa. 19405
Filed Dec. 15, 1969, Ser. No. 885,167
Int. Cl. B60p 1/28
U.S. Cl. 214—505  20 Claims

ABSTRACT OF THE DISCLOSURE

A roll-off trailer comprising a support frame and a main frame pivotally mounted thereon at the rear thereof. The rear wheels of the trailer are slidable relative to the support frame whereby they may be moved from the rear of the support frame to an intermediate point on the support frame. The support frame comprises two pivotally linked sections which are linked at the intermediate point to which the rear wheels may be moved. By pivoting the support frame at the intermediate point, a smaller roll-off angle is attained than that which would be obtained when using the prior art unsplit support frames on roll-off trailers. Having the smaller roll-off angle facilitates the loading and unloading of container bodies and cargo on the main frame.

---

This invention relates to a trailer, and more particularly, to a trailer of the roll-off type.

Trailers are now in use which include pneumatic or hydraulic cylinders for tilting the frame of the trailer to load or unload a cargo or a container by rolling the same off or on the trailer body. Power operated winches are furnished to aid in the loading or unloading operation. In all of the trailers now in use, an overhang of approximately four or five feet is required beyond a rear pivot point for the loading or unloading operation. Having this overhang requires an angle of approximately 45° for the loading or unloading operation. Because of the sharp angle, a great deal of care is necessary in the unloading of the cargo. Likewise, it has been found that it is extremely difficult to load heavy cargos onto the trailer in view of the necessity of winching these cargos up a 45° incline.

Since the rear end of the trailer bed must contact the ground during the loading and unloading operation, the overhang must necessarily be four or five feet. This overhang can cause problems of weight distribution during the use of the trailer. However, up till the time of the present invention, the four or five foot overhang was necessary in order to render the roll-off feature of the trailer operational.

The trailer of this invention has all of the advantages of the roll-off trailers presently in use, but in addition, presents a number of distinct improvements over all of the roll-off trailers in use. The trailer of this invention utilizes an overhang of approximately eighteen inches. Therefore, there is a weight distribution of the loaded cargo which is far superior to the weight distribution attainable with the roll-off trailers presently in use.

The trailer of this invention can also be utilized at an angle of approximately 22° for loading and unloading. This renders it far easier to load the trailer when considered against the 45° load angle of the trailers presently in use.

Another advantage of the trailer of this invention is that when utilizing an overhang of only eighteen inches at the rear pivot point, it is possible to dump the cargo at loading dock height. Utilizing the roll-off trailers presently in use wherein there is a rear overhang of four or five feet beyond the rear pivot point, it is impossible to raise the trailer bed frame to a sufficient dump angle to permit the unloading of the cargo at loading dock height.

It is accordingly an object of this invention to provide a novel trailer.

It is another object of this invention to provide a roll-off trailer that includes a roll-off or loading angle of approximately 22°.

It is a further object of this invention to provide a roll-off trailer having an overhang of approximately eighteen inches beyond the rear pivot point of the bed frame.

These and other objects of this invention are accomplished by providing a roll-off trailer comprising a support frame and a main frame pivotally linked to said support frame at one end thereof, a wheel assembly slidably mounted on said support frame, said wheel assembly being slidable from a first position at said one end of said support frame to a second position at an intermediate point on said support frame, said support frame comprising two sections, said sections being pivotally linked at said intermediate point, and means for pivoting said main frame around said support frame at said one end.

Other objects and many of the attendant advantages of this invention will be readily appreciated as the same becomes better understood by reference to the following detailed description when considered in connection with the accompanying drawings wherein:

FIG. 1 is a side elevational view of the trailer of this invention, as mounted on a tractor;

FIG. 2 is a top plan view of the trailer of FIG. 1, with the dump body indicated schematically in phantom;

FIG. 3 is a side elevational view of the trailer of FIG. 1 in a roll-off position;

FIG. 4 is a side elevational view of the trailer of FIG. 1 in a dumping position;

FIG. 5 is a side elevational view, partially broken away, showing the loading of a dump body onto the bed frame of the trailer of this invention;

FIG. 6 is an enlarged sectional view taken along the line 6—6 of FIG. 3;

FIG. 7 is an enlarged sectional view taken along the line 7—7 of FIG. 2; and

FIG. 8 is a sectional view taken along the line 8—8 of FIG. 7.

Referring now in greater detail to the various figures of the drawings wherein like reference characters refer to like parts, a roll-off trailer embodying the present invention is generally shown at 10 in FIG. 1. Device 10 basically comprises a support frame 12, a main or bed frame 14 and a rear wheel assembly 16.

Support frame 12 comprises a pair of spaced rear beams 18 and a pair of spaced front beams 20 (FIG. 2). As seen in FIG. 3, front beams 20 are pivotally mounted to rear beams 18 by rods 22 at an intermediate point on the rear beams. The rear beams 18 terminate at forward edges 24 (FIG. 3). The rear end of each beam 18 is rounded at its upper surface, and includes a bevelled edge 26. The purpose of bevelled edge 26 is to rest on the ground when the trailer is used for loading and unloading of its cargo, as seen in FIG. 3. As further seen in FIG. 3, the rear wheel assembly 16 is moved toward the front of the trailer during this operation. The movement of the rear wheel assembly will be described in further detail hereinafter.

Beams 18 are held in their spaced relationship by cross beams 28 which are welded to beams 18 (FIGS. 2 and 7). A plate 30 (FIGS. 2, 7 and 8) is also welded to beams 18 and extends horizontally between them. A pin 32 is secured in a block 34 (FIG. 3) which is welded to and extends outwardly from the side of each beam 18. A sleeve 36 is welded to the bottom of each beam 18 (FIGS. 2 and 3).

An aligning plate 38 is welded in the inside face of each beam 20 adjacent the forward edge 24 of each beam 18, and projects upwardly from the beam 20. Each forward beam 20 includes a lower horizontal section 40, an upper horizontal section 42 and an inclined section 44 joining the two horizontal sections. The upper horizontal section 42 is used for mounting the trailer 10 onto a tractor which is generally shown at 46 in FIG. 1.

The tractor 46 can be of any desired construction, and includes a cab 48 and rear wheels 50, together with the usual motor, transmission, differential and other conventional mechanisms for driving and steering the tractor. The tractor per se forms no part of this invention. As is the usual practice, the tractor is provided near the rear end thereof with a flat disc 52 having a centrally located aperture therein, this disc being welded or otherwise rigidly secured to the chassis frame of the tractor, and constituting what is commonly known as the fifth wheel of the tractor. Trailer 10 is secured to the tractor by the insertion of pin 54 into the aperture in the disc 52 of the tractor, as is conventional in the art. Pin 54 is welded, or otherwise secured, to the upper horizontal frame section 42.

A pair of wheeled supports 56 is secured to forward support frame section 20. Supports 56 are used for supporting the forward end of the trailer 10 when the trailer is separated from the tractor 46. When the tractor 46 is in the position shown in FIG. 1, the wheeled supports 56 are elevated from the ground, as shown in FIGS. 1 and 3. Supports of this type are well known in the art for this purpose.

A vertically extending plate 58 is secured to the inside face of each beam 20. A rod 60 (FIG. 2) is secured in plates 50 and passes between beams 20. A hydraulic cylinder 62 having a plurality of telescoped pistons 64 (FIG. 4) has one end pivotally mounted on rod 60. A tube 66 is connected to hydraulic cylinder 62 to furnish a source of hydraulic fluid. Cylinder 62 is of a type well known in the art, and the specific cylinder used and the control mechanism therefor per se form no part of the present invention. Any of the fluid-pressure actuated cylinders known to the art can be used in carrying out the present invention.

A pair of spaced blocks 68 (FIGS. 1 and 2) is secured on the underside of each beam 20. Blocks 68 project inwardly from beams 20 and are spaced a distance slightly greater than the outer diameter of sleeves 36. Sleeves 69 (FIG 2) are mounted between and secured to blocks 68 at positions spaced inwardly from beams 20.

Main or bed frame 14 comprises a pair of spaced beams 70 (FIG. 2). As seen in FIG. 7, the rear end of each beam 70 is provided with a smooth arcuate edge 72. As seen in FIG. 2, a plurality of rods 74 pass between beams 70, and have their ends projecting through the beams. A roller 76 is journalled on each projecting end of a rod 74.

A plate 78 is secured to the forward ends of beams 70. A hydraulic winch 80 (FIGS. 2 and 8) is mounted on plate 78. Winch 80 includes a hydraulic motor 82, a drum 84 and a cable 86 wound on the drum. A hydraulic line 88 (FIG. 2) is connected to motor 82. Any power operated winch known to the art can be used in carrying out this invention, and the specific details of the winch form no part of the invention. Winches of this type have been used in the trailer art in the past and are generally known to the art.

A plate 90 (FIGS. 7 and 8) is welded to the inside face of each beam 70. Each beam 70 is pivotally connected to its associated beam 18 by a pin 92 passing through each beam 18 and plate 90 (FIG. 8). As seen in FIGS. 7 and 8, each beam 70 rests on its associated beam 18 throughout the entire length of beams 18. The upper end of the uppermost piston 64 of hydraulic cylinder 62 is pivotally linked by sleeve 94 to a rod 74 (FIGS. 2 and 7).

The rear wheel assembly 16 comprises eight rear wheels 96 mounted on tandem axles 98 (FIGS. 7 and 8). A tubular axle housing 100 (FIG. 7) surrounds each axle 98. The rear wheel assembly 16 further includes a pair of U-shaped beams 104 (FIG. 8). Each beam 104 comprises a horizontal plate 106 and upstanding legs 108. Beams 104 are laterally spaced and held in this spacing by a pair of cross-plates 110 and 112 (FIG. 7) which are welded to inner legs 108 of each of the beams 104. As seen in FIG. 8, rear beams 18 of support frame 12 lie on horizontal sections 106 of beams 104. Sections 106 are sufficiently wide, as seen in FIG. 8, to receive the forward beams 20 of support frame 12. The beams 104 serve as a track for the sliding movement of beams 18 and 20, as will be explained hereinafter.

Mud guards 114 are secured to beams 104. Shackles 116 are also secured to the underside of each beam 104. Shackles 116 support leaf springs 118 which are in turn clamped to axle housings 100 (FIG. 7). Two air brake assemblies 120 (FIG. 7) are mounted on each axle housing 100. Air brake assemblies 120 includes diaphragms 122 and air supply tubes 124 (FIG. 2). Wheels 96 are provided with brake drum assemblies 126 (FIGS. 7 and 8) which are controlled by the air brake assemblies 120.

Each beam 104 is provided with an upstanding plate 128 at the forward end thereof (FIGS. 3 and 4). Plate 128 is rigidly secured to a leg 108 of each beam 104. The pin 32 projecting from each beam 18 is adapted to be received in the hooked end 130 of plate 128, as seen in FIGS. 1 and 4.

In the embodiment of the invention shown, a dump body 132 is mounted on main frame 14. Dump body 132 includes a front wall 134 (FIG. 6), a pair of side walls 136 and a rear gate 138. The side walls 136 include vertical reinforcing ribs 140 and an upper horizontal rib 142. Ribs 144 are positioned at each corner of the dump body. A horizontal rib 146 extends along the entire length of the bottom of each side of dump body 132.

As seen in FIG. 8, a series of horizontal ribs 148 (one shown) extend laterally across the bottom of dump body 132. Two longitudinally extending beams 150 pass longitudinally along the bottom of dump body 132 and are mounted on the horizontal ribs 148. Beams 150 rest on rollers 76 which are rotatably mounted on the ends of rods 74. Blocks 152 are mounted on the forward ends of beams 150. Rollers 154 are journalled on pins projecting from blocks 152.

The front wall 134 of dump body 132 includes an inwardly inclined lower plate 156 (FIG. 5). A hook 158 is welded to plate 156. Cable 86 of winch 80 is secured to hook 158. A roller 160 is mounted on the bottom of the rear end of each horizontal rib 146.

The use of the trailer 10 as a dump trailer is shown in FIG. 4. Dumping is initiated by actuating hydraulic cylinder 62 which in turn will cause the pivoting of main frame 14 about pins 92. This in turn will incline the dump body 132 to the position shown in FIG. 4. The dump body 132 is held on frame 14 by cable 86 of winch 80. If desired, auxiliary clamping devices can be used for holding the dump body 132 on the frame 14. During the dumping action, the rear gate 138 of the dump body is pivoted to an open position (not shown).

After dumping has been completed, the pressure on hydraulic cylinder 62 is released, and the piston 64 will return to the position shown in FIG. 1, thereby returning the dump body 132 to the horizontal position shown in FIG. 1. Plates 38, which are secured in the inner face of forward beam 20, are flared outwardly, and serve as guides for the re-seating of the frame 14 when it is lowered to the horizontal position.

When it is desired to roll the entire dump body off the trailer bed, rods 162, which are positioned in sleeves 36 of beam 18 and sleeves 69 of beam 20 (FIG. 2), are slid out of the sleeves. Then rear wheel assembly 16 is locked by locking the air brakes 120. Thereafter, tractor 46 is backed up, thereby sliding the frame 12 in the track formed by beam 104 of the wheel assembly. The upstanding legs 108 of beam 104 insure that the frame 12 will move rectilinearly within the track. The backing of the truck is continued until the wheel assembly 16 is in the position shown in FIG. 3. The rear blocks 68 serve as a stop for the backward movement of the tractor and trailer.

With the wheels in the position shown in FIG. 3, the pivot pins 22 are beyond the ends of the beams 104. Thereafter, hydraulic cylinder 62 is actuated, and the rear beams 18 are pivoted around pins 22 until the bevelled edge 26 abuts the ground. The pivoting of the beams 18 will in turn carry frame 14 and the associated dump body 132 to the same angle of inclination as the beams 18. This angle of inclination is approximately 22°.

After the beams 18 have been pivoted to the position shown in FIG. 3, the tension on the cable 86 is released, thereby permitting the dump body to roll backward along rollers 76. The first part of the dump body to contact the ground will be the rear rollers 160. Normally, the dump body will completely roll off the trailer under the force of gravity. However, if there is any difficulty encountered during the rolling off process, hydraulic cylinder 62 can be raised slightly, thereby increasing the roll-off angle, thus permitting the complete removal of the dump body from the trailer.

When it is desired to load a new dump body or other cargo onto the trailer, the beams 18 are again pivoted to the position shown in FIG. 3, thereby pivoting the frame 14 to the same position. Cable 86 is then engaged in hook 158 of the dump body 132 (FIG. 5). Hydraulic winch 80 is then actuated, thereby drawing rollers 154 onto the arcuate surface 72 of beams 70. This elevates the dump body 132 off the ground and permits the rolling of the rear end of the dump body on rollers 160. Continued winding of winch 80 will move the dump body 132 along beams 70 in the direction of arrow 164 (FIG. 5). Continued movement of the dump body will permit the engagement of beams 150 of the dump body with rollers 76, thereby permitting the rolling of the dump body onto the frame 14 along rollers 76. Eventually, the dump body 132 will be drawn by winch 80 to the position shown in FIG. 3.

After the dump body has been rolled into place, hydraulic cylinder 62 is retracted, thereby returning beams 18 and frame 14 to a horizontal position. During the downward movement of beams 18 and frame 14, plates 38 will serve as a guide to insure the proper alignment of the beams 18 and frame 14 with beams 20. When the beams 18 are horizontal, sleeves 36 will be received between blocks 68. Rods 162 are then reinserted into sleeves 36 and 69 thereby securing the beams 18 to beams 20 to retain beams 18 in a horizontal position.

After the beams 18 and frame 14 are returned to the horizontal position, tractor 46 is driven forwardly. This will slide the beams 20 and 18 along the tracks provided by beams 104. The forward movement of the tractor is continued until hook-shaped members 130 engage pins 32 which protrude from the sides of beams 18. The rear wheel assembly 16 is then locked in place through the use of hydraulic cylinder 166 (FIG. 7) which is mounted on the underside of plate 110 of the rear wheel assembly. Piston pin 168 of cylinder 166 is urged upwardly through a hole in plate 110 and through a hole in plate 30 of support frame 12, thereby securing assembly 16 to frame 12. A suitable hydraulic line 170 is connected to cylinder 166, and is used for controlling the raising and lowering of pin 168.

When it is desired to slide beam 18 relative to beam 104, piston pin 168 is lowered, thereby freeing assembly 16 from frame 12. After the pin 168 has been returned to the position shown in FIG. 7, the air brakes 120 are released, and the trailer may again be moved.

The trailer of this invention can be made of any of the materials known to the art. Generally, steel beams will be used for the major part of the framing. The steel beams can be of any type known to the art, such as I-beams or rectangular tubular beams.

The trailer can be used with all types of cargo when used as a roll-off trailer. The showing of the dump body 132 is merely exemplary. Thus, when the trailer is in the position shown in FIG. 3, all types of cargo generally used on a roll-off trailer can be loaded or unloaded. For instance, tank bodies or containered cargo can be accommodated by the trailer of this invention.

One of the prime features of the roll-off trailer of this invention is the fact that loading can be carried out at approximately a 22° angle, as shown in FIG. 3. This is accomplished by having the split support frame 12 with the rear beams 18 being pivotable at their mid-points around pins 22. In the prior art roll-off trailers, the support frame was unitary and all pivoting took place at the rear of the frame in the position indicated at pins 92. The overhang beyond the rear point in the trailers presently in use in approximately four feet to five feet. This is necessary to permit the main or bed frame to contact the ground during loading. With the pivoting taking place at the rear of the support frame, the angle of loading is approximately 45°, which angle is shown for the dump position of the trailer of this invention in FIG. 4. It has been found to be extremely difficult, if not impossible, to roll heavy cargos up the inclination of 45° when using the roll-off trailers presently in use.

Accordingly, it is seen that the combination of the slidable mounting for the rear wheel assembly 16 and the split support frame 12 enables the carrying out of one of the major objectives of this invention, that is, the loading of a roll-off trailer at a relatively small angle of inclination. Because the support frame is split in the manner described, the overhang at the rear of the trailer is extremely small, being on the order of eighteen inches beyond the rear pivot point 92. This in turn gives rise to the further advantage of being able to unload the cargo on the trailer at loading dock height. Thus, since there is only a small amount of overhang beyond pivot pins 92, the frame 14 can be pivoted around the pins to a small angle of inclination without the rear end of the frame contacting the loading dock. This permits the rolling off of the cargo directly onto the loading dock. In the prior art roll-off trailers, the overhang of four or five feet prevents the inclining of the bed frame at the loading dock because the rear of the bed will contact the dock as soon as the frame is raised. Accordingly, there will not be a sufficient angle of inclination to permit the unloading of the cargo.

Without further elaboration, the foregoing will so fully illustrate my invention, that others may, by applying current or future knowledge, adopt the same for use under various conditions of service.

What is claimed as the invention is:

1. A trailer comprising a support frame and a main bed frame pivotally linked to said support frame, a wheel assembly supporting said support frame, said support frame being slidably mounted on said wheel assembly, said support frame being slidable from a first position wherein said wheel assembly is at one end of said support frame to a second position wherein said wheel assembly will be positioned forward of an intermediate point on said support frame, said support frame comprising a rear section and a front section, said main bed frame being pivotally linked to said rear section, and said sections being pivotably linked at said intermediate point, whereby said rear section and bed frame may be pivoted relative to said front section for loading and unloading when said wheel assembly is positioned forwardly of said intermediate point.

2. The trailer of claim 1 wherein said wheel assembly comprises at least one track and a plurality of wheels mounted below said track, said support frame being slidable in said track.

3. The trailer of claim 2 wherein said support frame comprises a pair of rear beams comprising said rear section and a pair of front beams comprising said front section and said wheel assembly comprises a pair of tracks, with said beams being slidably mounted in said tracks.

4. The trailer of claim 1 and further including means to prevent the movement of said wheel assembly when said support frame is slid relative to said wheel assembly.

5. The trailer of claim 4 wherein said movement preventing means for said wheel assembly comprises an air brake assembly which is adapted to lock the wheels of said wheel assembly.

6. The trailer of claim 1 and further including stop means which is adapted to position said wheel assembly beyond said intermediate point when said support frame is slid relative to said wheel assembly.

7. The trailer of claim 1 and further including stop means to terminate the forward movement of said support frame when said support frame is slid forwardly relative to said wheel assembly, thereby positioning said wheel assembly at said first position at one end of said support frame.

8. The trailer of claim 7 wherein said stop means comprises at least one hook-shaped member on said wheel assembly and at least one pin projecting outwardly of said support frame, said pin being engaged by said hook-shaped member during the forward movement of said support frame relative to said support frame.

9. The trailer of claim 1 and further including means to releasably secure said wheel assembly to said support frame when said wheel assembly is at said first position.

10. The trailer of claim 9 wherein said means to releasably secure said wheel assemly to said support frame comprises a hydraulic cylinder having a piston reciprocably mounted therein, said piston being adapted to be received in said support frame when said wheel assembly is secured to said support frame, and said piston adapted to be removed from said support frame when said wheel assembly is released from said support frame.

11. The trailer of claim 1 and further including means to maintain said rear section and said front section of said support frame in the same horizontal plane.

12. The trailer of claim 11 wherein said maintaining means comprises at least one sleeve mounted on said rear section and at least one sleeve mounted on said front section, said sleeves being aligned when said front and rear sections lie in the same horizontal plane, and a rod releasably secured in said sleeves.

13. The trailer of claim 1 and further including means for pivoting said rear section relative to said front section.

14. The trailer of claim 13 wherein said pivoting means comprises a hydraulic cylinder.

15. The trailer of claim 1 wherein said main bed frame includes roller means thereon, whereby a cargo may be rolled onto said main bed frame.

16. The trailer of claim 15 and further including means to roll a cargo onto said main bed frame.

17. The trailer of claim 16 wherein said means for rolling a cargo comprises a power actuated winch.

18. The trailer of claim 17 wherein said winch is hydraulically actuated.

19. The trailer of claim 1 wherein said main bed frame is pivotally linked to said support frame at said one end thereof, and further including means for pivoting said main bed frame around said support frame at said one end.

20. The trailer of claim 19 wherein said pivoting means comprises a hydraulic cylinder.

References Cited

UNITED STATES PATENTS

| | | | |
|---|---|---|---|
| 2,717,707 | 9/1955 | Martin | 214—505 |
| 2,741,383 | 4/1956 | Leckert | 214—505 |
| 3,208,615 | 9/1965 | Wolf | 214—505 |

ALBERT J. MAKAY, Primary Examiner

U.S. Cl. X.R.

214—517; 280—80B; 298—15, 17.5, 22R